US012664460B2

(12) United States Patent
Yu et al.

(10) Patent No.: US 12,664,460 B2
(45) Date of Patent: Jun. 23, 2026

(54) OPTIMIZING FEATURE IMPORTANCE FOR BINARY CLASSIFICATION

(71) Applicant: International Business Machines Corporation, Armonk, NY (US)

(72) Inventors: Dong Hai Yu, Xian (CN); Jun Wang, Xian (CN); Si Er Han, Xian (CN); Xiao Ming Ma, Xian (CN); Lei Gao, Xian (CN); A Peng Zhang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 1476 days.

(21) Appl. No.: 17/225,800

(22) Filed: Apr. 8, 2021

(65) Prior Publication Data

US 2022/0327418 A1      Oct. 13, 2022

(51) Int. Cl.
*G06N 20/00* (2019.01)
*G06F 16/28* (2019.01)
*G06N 20/20* (2019.01)

(52) U.S. Cl.
CPC ........... *G06N 20/00* (2019.01); *G06F 16/285* (2019.01); *G06N 20/20* (2019.01)

(58) Field of Classification Search
CPC ....... G06N 20/00; G06N 20/20; G06F 16/285
See application file for complete search history.

(56) References Cited

U.S. PATENT DOCUMENTS 7,756,799 B2      7/2010  Kirshenbaum
2014/0358828 A1 * 12/2014  Phillipps ................ G06N 20/00
706/12

2018/0060738 A1      3/2018  Achin et al.
2020/0118036 A1      4/2020  Karnagel et al.
2020/0184367 A1      6/2020  Shivamoggi et al.
2023/0148321 A1 *    5/2023  Hall ...................... G06F 18/217
706/12

FOREIGN PATENT DOCUMENTS

CN          109242021 A      1/2019
CN          110991474 A      4/2020

OTHER PUBLICATIONS

Brownlee, Jason, "How to Calculate Feature Importance With Python" [online], Data Preparation Blog, retrieved on Aug. 20, 2020, from the Internet URL: https://machinelearningmastery.com/calculate-feature-importance-with-python/ (2020).
Neshatian, Kourosh, et al., "Genetic Programming for Feature Subset Ranking in Binary Classification Problems", Proc. European Conf. on Genetic Programming, v. 5481, pp. 121-132 (2009).

* cited by examiner

*Primary Examiner* — Cesar B Paula
*Assistant Examiner* — John M Heffington
(74) *Attorney, Agent, or Firm* — David K. Mattheis

(57)          ABSTRACT

Feature importance is critical to understanding how predictive models produce accurate results, and can change significantly for different models. The present invention is used to achieve a good ranking for stable feature importance. An optimized technique is presented which considers feature importance value variation within different groups of cross-trained models. Feature importance is computed for all group models with this optimized method, and then a best set of models can be selected based on classification error as well as optimized stable feature importance values.

20 Claims, 5 Drawing Sheets

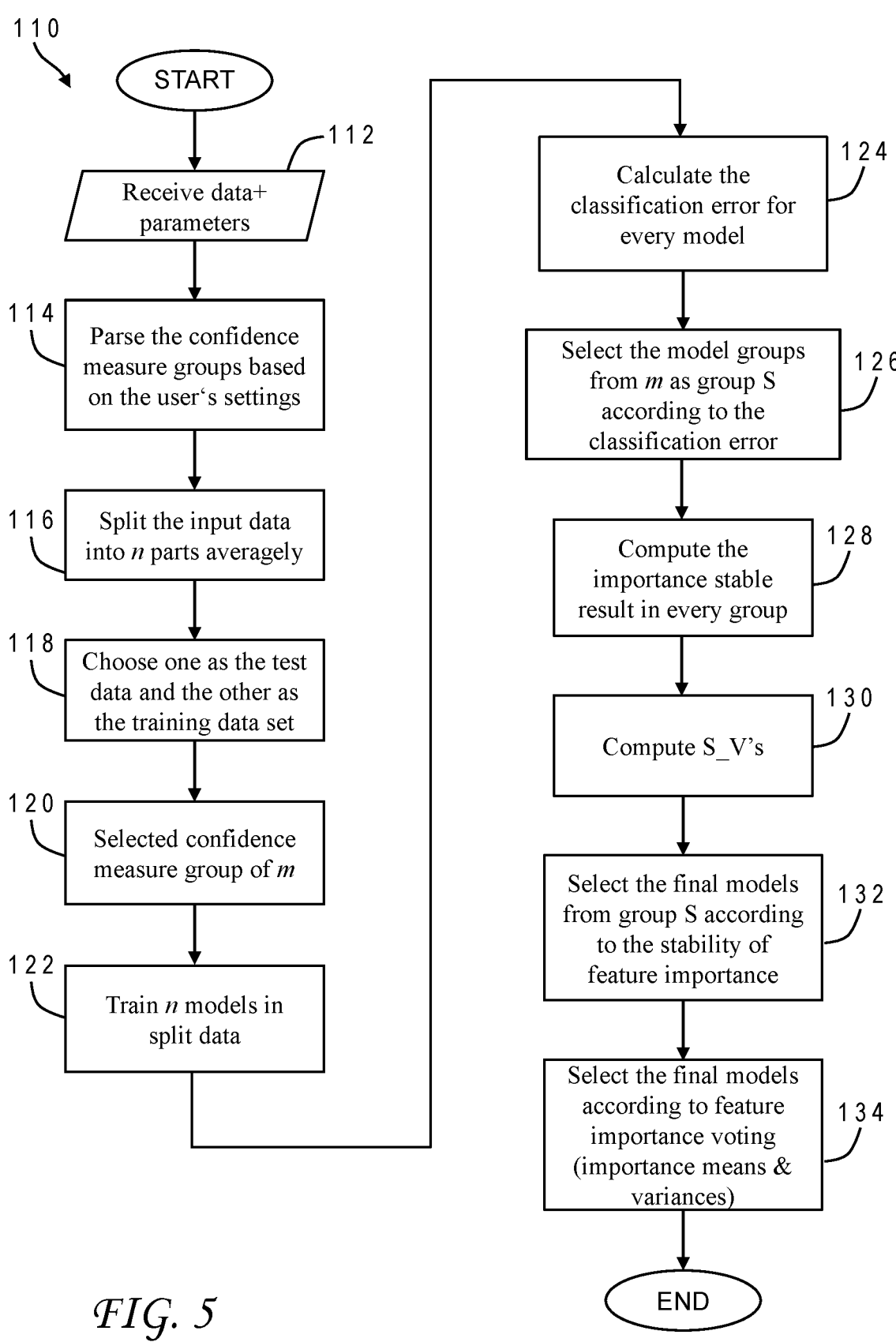

110

START

112

Receive data+ parameters

114

Parse the confidence measure groups based on the user's settings

116

Split the input data into *n* parts averagely

118

Choose one as the test data and the other as the training data set

120

Selected confidence measure group of *m*

122

Train *n* models in split data

124

Calculate the classification error for every model

126

Select the model groups from *m* as group S according to the classification error

128

Compute the importance stable result in every group

130

Compute S_V's

132

Select the final models from group S according to the stability of feature importance

134

Select the final models according to feature importance voting (importance means & variances)

END

*FIG. 5*

OPTIMIZING FEATURE IMPORTANCE FOR BINARY CLASSIFICATION

BACKGROUND OF THE INVENTION

Field of the Invention

The present invention generally relates to artificial intelligence and binary classifiers, and more particularly to a method of optimizing feature importance for training such systems.

Description of the Related Art

A cognitive system (sometimes referred to as deep learning, deep thought, or deep question answering) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feedforward neural network based on animal visual perception, and so is particularly useful in processing image data. Convolutional neural networks are similar to ordinary neural networks but have feedback loops.

There are many alternatives to the use of neural networks for machine learning, such as a support vector machine (SVM). An SVM basically constructs a multidimensional mathematical space based on training examples, and provides a boundary in that space that allows for binary classification of an input, e.g., as a "good" answer versus a "bad" answer. Another approach involves Bayesian networks which represent a set of variables with a directed acyclic graph. The network is then used to compute probabilistic relationships between the variables. A cognitive system is not limited to use of a single approach, i.e., it can incorporate any number of these machine learning algorithms.

One application of cognitive systems is for binary classification. A machine-learning classifier is used to identify what category that particular input data belongs to. In a generic binary classifier model, a plurality of features $f_1$, $f_2$, . . . , $f_n$ are selected to represent an input scenario, and are formatted as inputs to respective input nodes of the network. The features can be practically any variable associated with a given application.

Feature importance represents the statistical significance of each variable in the data with respect to its effect on the generated model. Feature importance can be considered a predictor ranking based on the contribution predictors make to the model. Evaluating feature importance helps to weed out certain predictors that are contributing to nothing in the outcome but instead add time (expense) to process. There are various conventional methods of measuring feature importance; see, e.g., U.S. Patent Application Publication No. 2018/0060738.

SUMMARY OF THE INVENTION

The present invention in at least one embodiment is generally directed to a method of optimizing feature importance for binary classification by receiving a plurality of binary classification models, generating multiple confidence threshold values, building multiple model groups including each of the binary classification models for a different one of the confidence threshold values, splitting training data into multiple parts and forming different training data sets from the parts, cross-training all models within each model group using the different training data sets, computing an individual classification error for each model in each model group, merging individual classification errors for all models within a particular model group to arrive at a combined classification error for each model group, selecting a set of the model groups based on their respective combined classification errors relative to an error threshold, calculating a feature importance value for each feature in each model of a given model group in the set, computing an importance stability value for each model group in the set based on the feature importance values, selecting a final model group from the set having the maximum importance stability value, and selecting a plurality of optimized features based on a ranking of feature importance for the final model group. The multiple confidence threshold values can be generated by incrementing a starting confidence threshold value by a step value; the starting confidence threshold value can be based on a ratio of positive-to-negative cases in the training data. In the illustrative implementation a given training data set excludes at least one part of the training data, and a given individual classification error is computed by testing each model using a respective one of the excluded parts of the training data. The importance stability value for a given model group can be computed by first computing intermediate stability values for different pairs of models in the given model group according to a number of changed feature importance values between models in a given pair, and then summing the intermediate stability values of all pairs in the given model group. If there is more than one final model group having the maximum importance stability value, a particular one of the final model groups can be further selected based on a voting scheme that uses means and variances of the feature importance values for models in each of the final model groups.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

FIG. 5 is a chart illustrating the logical flow for an overall feature importance optimization process in accordance with one implementation of the present invention.

The use of the same reference symbols in different drawings indicates similar or identical items.

DESCRIPTION OF THE PREFERRED EMBODIMENT(S)

In considering feature importance, it can be difficult to understand the nature of the prediction problem itself, as well as how specific predictive models produce accurate prediction results. Not surprisingly, a binary classification model designer sometimes thinks a particular variable must contribute to the model, but its feature importance results are very poor. Feature importance order can change significantly for many different models, so it can be impractical to achieve any good ranking of feature importance. When selecting the best model to use, the classification error is generally the only parameter considered, but this approach often results in inferior stability characteristics for variable importance. In other words, for many models feature importance is very unstable although the error is small. If the model changes slightly, the order of feature importance will change greatly. So for classification models, optimum feature importance cannot be achieved based on the classification error selection model.

It would, therefore, be desirable to devise an improved method of optimizing feature importance for binary classification while still retain the best overall model. It would be further advantageous if the method could be used even when models are trained with unbalanced data. These and other advantages are achieved in various implementations of the present invention by building different group models based on different confidence thresholds which are generated by varying a small step value based on a ratio of positive-to-negative cases. An optimized technique for computing feature importance is presented which considers feature importance value variation within each group model. Feature importance can be computed for all group models with this optimized method, and then a best set of models can be selected based on classification error as well as optimized stable feature importance values. The present invention in its various embodiments thereby provides a significant improvement in the technical field of training machine-learning systems.

Figure 1:
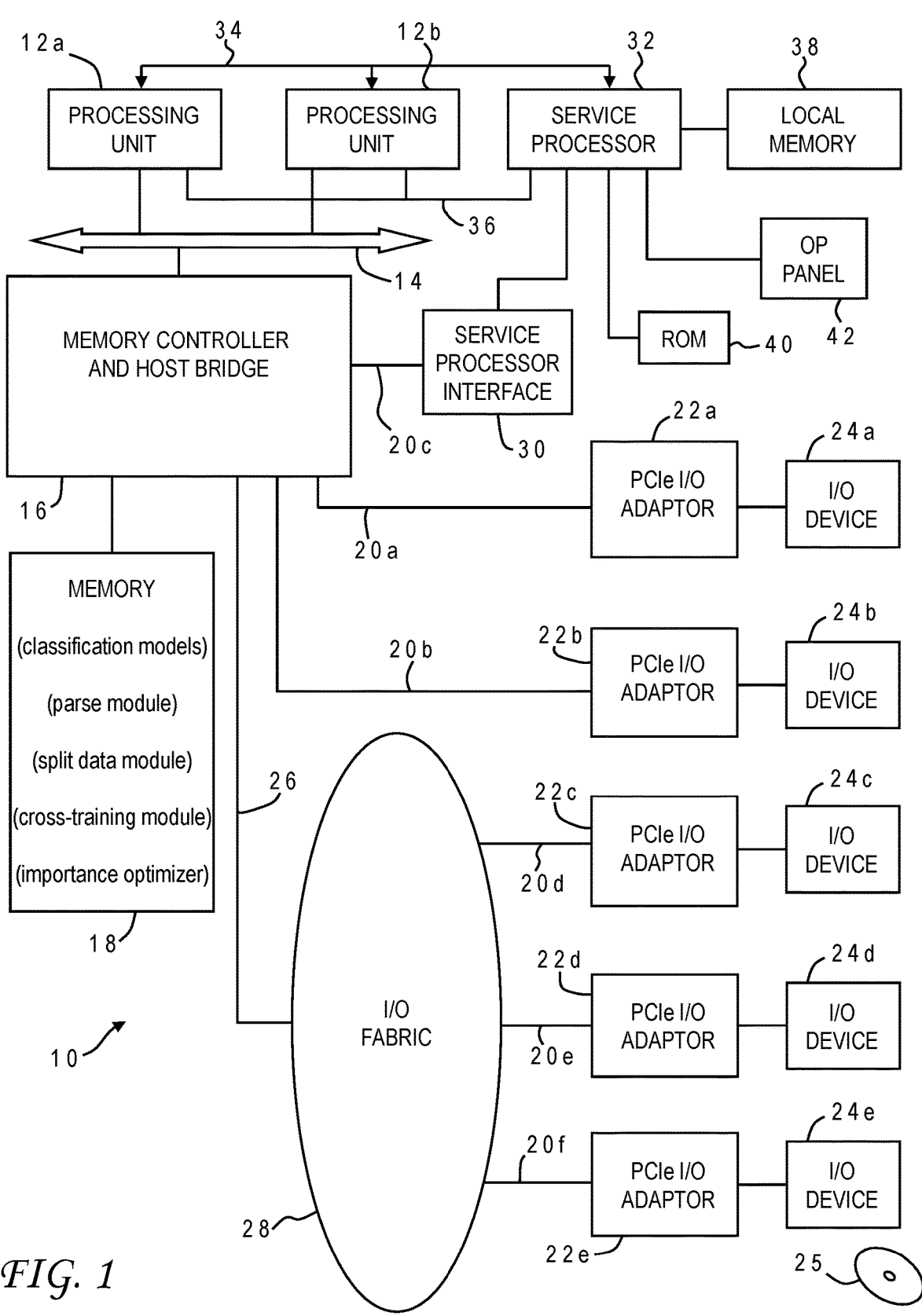
FIG. 1 is a block diagram of a computer system programmed to carry out feature performance optimization in accordance with one implementation of the present invention.

With reference now to the figures, and in particular with reference to FIG. 1, there is depicted one embodiment 10 of a computer system in which the present invention may be implemented to carry out optimization of feature importance for binary classification. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications or modules in accordance with the present invention, including a parser module, a split data module, a cross-training module, and an importance optimizer.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the feature importance optimizer of the present invention, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a feature importance optimization process that uses novel cross-training techniques to identify stable feature importance as well as preferred classification models. Accordingly, a program embodying the invention may additionally include conventional aspects of various feature importance and training tools, and these details will become apparent to those skilled in the art upon reference to this disclosure.

Figure 2:
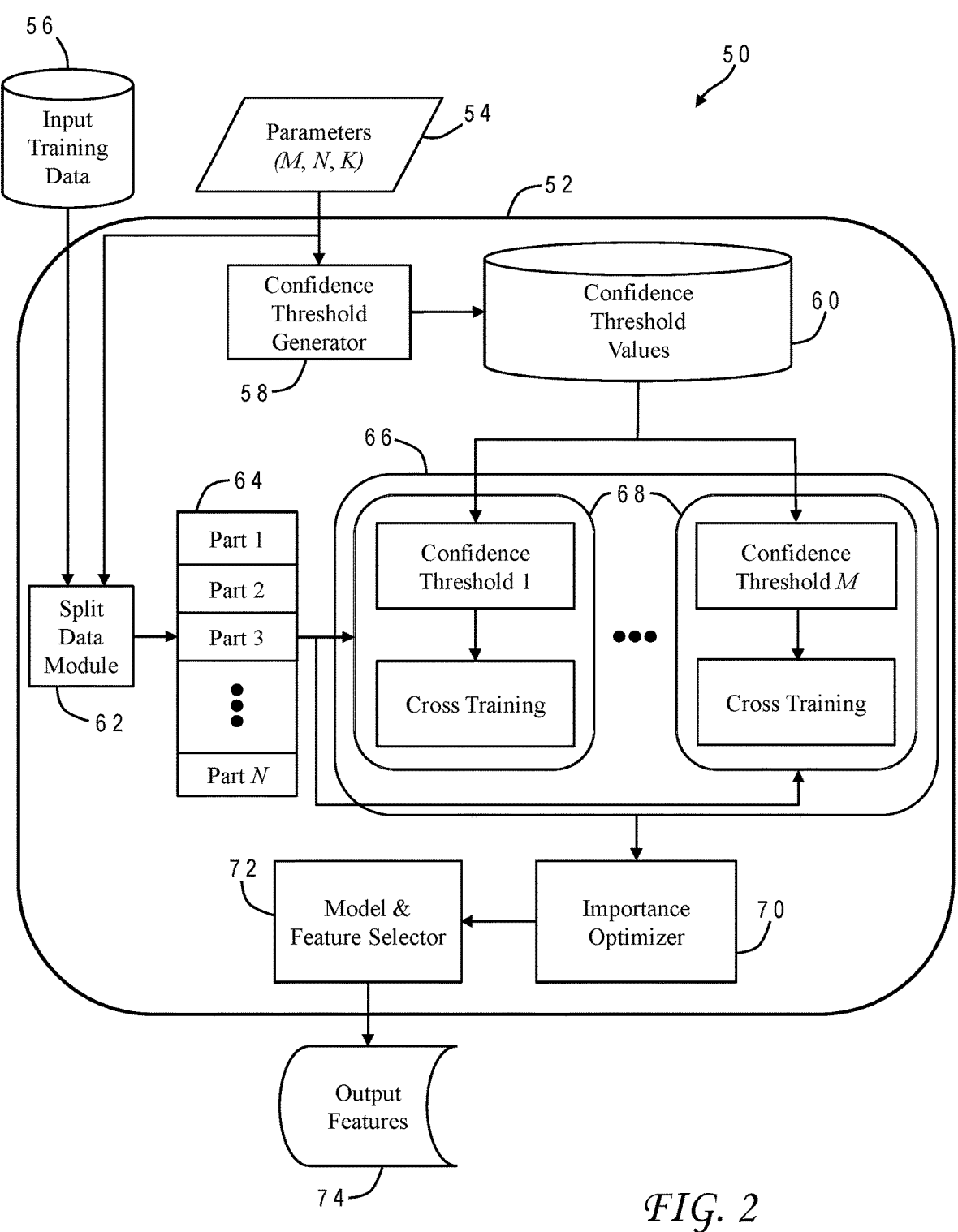
FIG. 2 is a block diagram of a feature performance optimization system in accordance with one implementation of the present invention.

Referring now to FIG. 2, there is depicted a feature importance optimization environment 50 in accordance with one embodiment of the present invention. Feature importance optimization environment 50 includes a feature analysis system 52 which receives one or more user-defined parameters 54 and input data 56 used in training and testing various classification models. In the exemplary implementation user-defined parameters 54 include a first number M of different confidence measures to be employed in establishing a set of confidence threshold values, a second number N of different sets that the training data 56 will be split into for cross-training different models, and a third number K for a maximum number of features selected from a given model for continued feature importance analysis. Input training data 56 may be curated by a subject matter expert or as otherwise conventionally obtained, and is formatted according to the particular scenario being modeled. For binary classification, each piece of training data 56 will thus include a set of j features and a corresponding label, e.g., either "YES" (binary one) meaning that the input scenario does represent the subject category of interest or "NO" (binary zero) meaning that the input scenario does not represent the subject category of interest.

A confidence threshold generator 58 (parser module) is used to build different model groups based on different confidence thresholds which can be generated according to the user parameter M. In the exemplary embodiment M is 10, so a confidence measure ranging from 0 to 1 is divided into ten confidence thresholds of 0.1, 0.2, . . . 0.9, 1.0. The confidence threshold values are stored as a confidence measures list 60. Alternatively, the confidence thresholds can be generated by varying a small step value starting at a confidence measure that is based on a ratio of positive-to-negative cases in the training data. For example, for a confidence range (output) of 0 to 1, the step value could be 0.01. If training data 56 has label values of 0 or 1 and 80% of this data has label 1 while 20% has label 0, then the starting confidence measure can be 0.8, and other thresholds are created at 0.81 and 0.79, then 0.82 and 0.78, etc.

A split data module 62 breaks up training data 56 into N average parts 64. These parts will be arranged differently for cross-training of classification models by choosing only one part as test data and the remaining parts as the training data set. This cross-training is carried out by cross-training module 66 and is applied to different groups 68 of the models, one for each of the different confidence threshold values 60. As explained further below in conjunction with FIG. 3, cross-training module 66 calculates a classification error for each model group after merging all models in a group, and calculates feature importance statistics for each model. An importance optimizer 70 culls model groups that have high classification errors and analyzes the feature importance statistics of the remaining model groups to determine the stability of feature importance, as explained further below in conjunction with FIG. 4. A selector 72 decides which models are best and which features have the optimum stability. Those optimum features are output 74 for use by the designer in crafting the best model inputs, e.g., different features can have different weights, or features not considered optimum can be completely removed from the model. The binary classifier is then trained using these optimum feature importance attributes, and can be subsequently deployed for end use.

Figure 3:
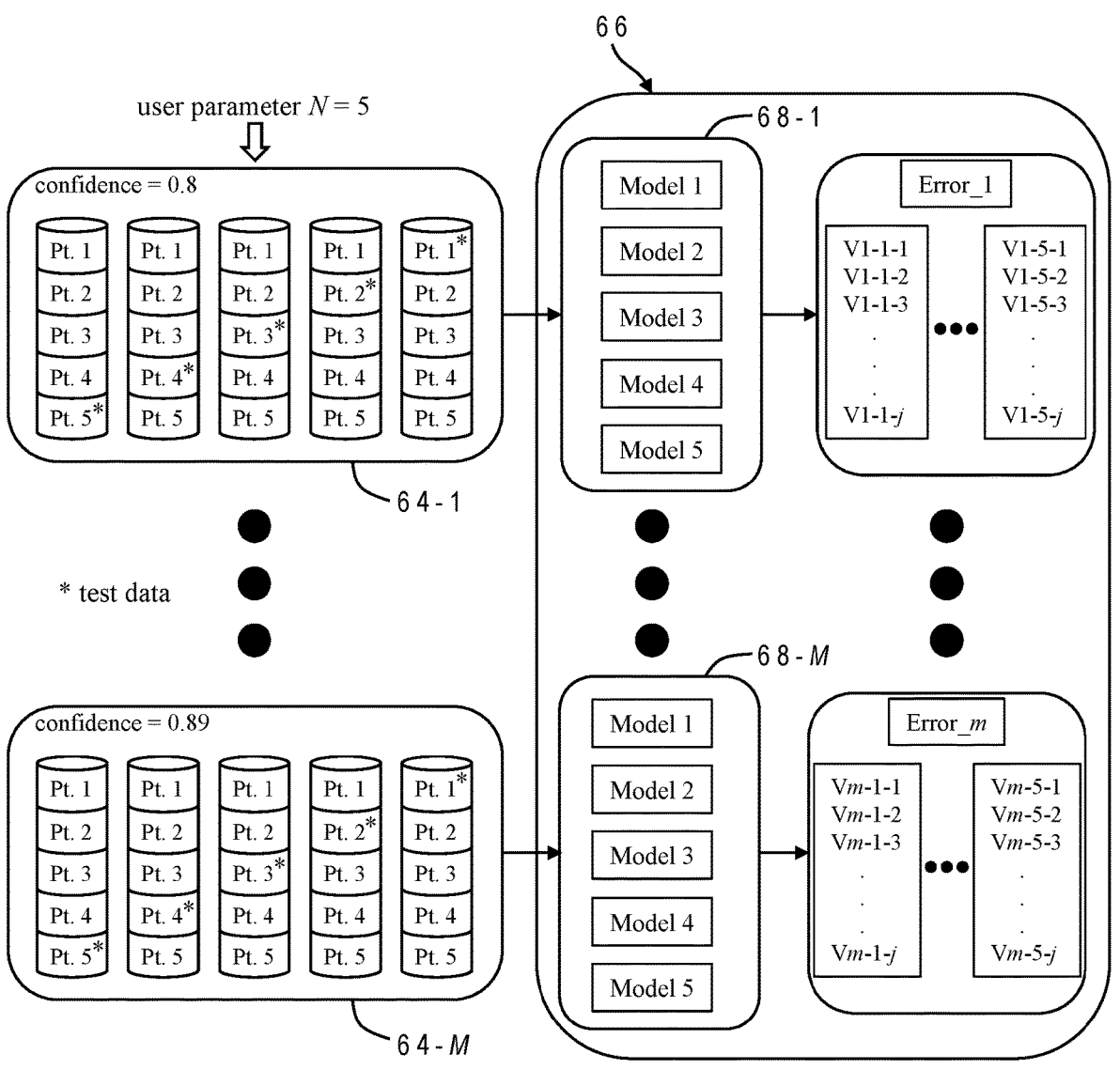
FIG. 3 is a pictorial representation of cross-training of a plurality of classification models to generate classification error statistics and feature importance statistics in accordance with one implementation of the present invention.

FIG. 3 shows further details of cross-training module 66 for an example wherein the confidence thresholds vary from 0.80 to 0.89 in increments of 0.01 (M=10), so a first training set 64-1 is used at the first confidence level and a final training set 64-M is used at the last confidence level. The training sets are applied to all models being considered. Further to this example there are five different models, so model group 68-1 includes Models 1 through 5 trained at confidence value 0.80 while model group 68-M includes Models 1 through 5 trained at confidence value 0.89. In other words, for a given model group, each Model 1 through 5 will undergo five different training exercises (N=5) where the training data changes according to which training part is being used for testing. This testing results in a classification error for such cross-training of each individual model within a group, and is repeated for each confidence measure group. In this implementation the classification errors from all models in a group are merged to yield a final classification error statistic "Error_i" for a given model group i.

Cross-training module 66 also computes feature importance statistics for each model in each group. Feature importance at this stage can be quantified according to any conventional techniques. Thus, for a given model group i, there will be five sets of feature importance statistics, one for each model in the group, each set containing j number of feature importance values, i.e., a feature importance statistic set for Model 1 can be expressed as $\{Vi\text{-}1\text{-}1, Vi\text{-}1\text{-}2, \ldots, Vi\text{-}1\text{-}j\}$. This computation is repeated for each confidence measure group.

Figure 4:
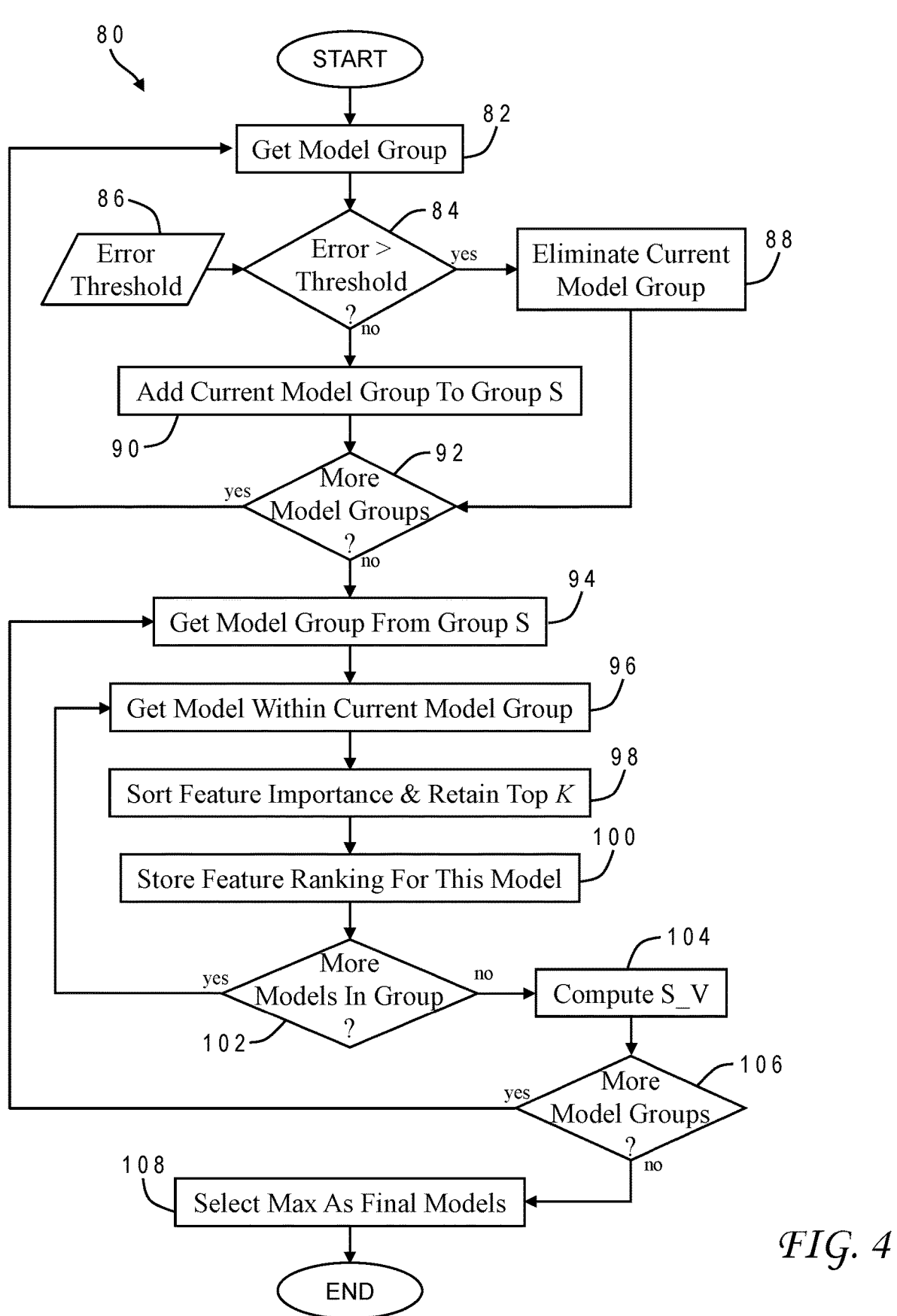
FIG. 4 is a chart illustrating the logical flow carried out by an importance optimizer of FIG. 2 in accordance with one implementation of the present invention.

Both the merged classification errors and the feature importance statistics from cross-training module 66 are used by importance optimizer 70 to arrive at optimum stability for feature importance while retaining the best models. FIG. 4 illustrates an importance optimization process 80 carried out by importance optimizer 70 in accordance with one implementation of the present invention. Process 80 begins by selecting 82 one of the models groups for analysis, e.g., beginning with the first model group 68-1. The merged classification error for the selected group is compared 84 to a user-defined error threshold 86 representing an error level that is acceptable to the designer. If the error for the current group is above the threshold, it is eliminated 88 from further consideration. If not, it is added 90 to a new model group S that will undergo further analysis. An exemplary threshold might for example be 0.8, i.e., if the error of a model is 0.7 then it will be retained but if the error of the model is 0.9 then it will be discarded. If there are more model groups to consider 92, the process returns to box 82 and the next model group is selected.

Once all models groups have been examined relative to the error threshold, analysis of the model groups in the new group S begins by selecting 94 one of these model groups. A model within this group is further selected 96. Feature importance for this model is sorted 98, and the top K features are selected for further analysis. K is also a user setting; a suitable default value is 10. The feature ranking is then stored 100. If there are more models in the current group 102, the process returns to box 96 to get the next group. Once feature importance for all models in the current group are sorted, a feature importance stability value S_V is calculated 104 for the group. Different metrics can be used to quantify the feature importance stability of the group. In a preferred implementation S_V has a nominal value of 1.0, and is computed by comparing feature rankings between different pairs of models in a given model group. If a feature ranking changes between these different pairs, a variable CN representing the number of changed features is incremented, and an intermediate value of S_V for a given model pair 1 is computed as:

$$S\_Vl = 1.0 - CN/K.$$

The final value of S_V for the current group is then computed as:

$$S\_V = \left(\sum_{l=1}^{W} (S\_Vl)\right)/W$$

where W is the total number of model pairs in the current model group.

If there are more model groups in the new group S 106, the process returns to box 94 to get the next model group, until feature importance stability values have been computed for all model groups in S. The model group with the highest value of S_V is then chosen 108 as the final model group, i.e., this group represents the most stable feature importance. If there are multiple groups having the same max S_V, a further voting process may be used to select a particular group. The mean and variance of every feature importance value for all models in the max S_V groups are computed. A model group whose means for a particular feature are the closest will get one vote, and a model group whose variance for a particular feature is the smallest will get one vote. For example, there may be three model groups all having the same max S_V, with three features being considered. The first of these model groups has the closest mean for two features, and so gets two votes; it also has the smallest variance for one feature so gets a third vote. The second of these model groups has the closet mean for one feature, and no smallest variances for features, so only gets one vote. The third of these model groups has no means that are closest for any feature, and two features for which the variances are the smallest, so gets two votes. When votes are tallied, the first model group has the most votes (three) and so becomes the final selected model group for feature importance optimization. If there is still more than one group having the highest votes (a tie vote), then the final model group can be selected by choosing the group with the smallest mean of all variances. All of these calculations allow the model and feature selector 72 of FIG. 2 to select a group of good models with relatively small classification error and stability feature importance, as well as the ranking of good features based on importance.

The present invention may be further understood with reference to the chart of FIG. 5 which depicts the logical flow for an overall feature importance optimization process 110 in accordance with one implementation of the present invention. First, the system receives 112 all of the various data parameters, both user-supplied and those inherent to the particular models being studied. The confidence measure groups are parsed 114 based on the user settings, the input training data is split 116 into multiple parts, and one part is chosen 118 as test data while the other is to be used as a training data set. Confidence measure group are successively selected 120 for training, and trained 122 according to the split data. The classification errors and feature importance values for each trained model are calculated 124, and the model groups with the lowest merged classification error are selected 126 for further consideration. Feature importance is computed 128 for every model group in group S, and importance stability parameters S_V are computed 130. The optimized model group is selected 132 according to this stability and if necessary further voting takes place 134 using the importance means and variances to narrow down the best models. In this manner, the present invention in its various embodiments allows the model designer to identify the more stable feature importance, get better confidence measure groups for prediction, and arrive at a more meaningful set of features which can pave the way for a robust prediction model.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described with reference to binary classifiers but it is equally applicable to other machine-learning systems. It is therefore contemplated that such modifications can be made without departing from the spirit or scope of the present invention as defined in the appended claims.

What is claimed is:

1. A computer-implemented method of optimizing feature importance for binary classification comprising:
    receiving a plurality of binary classification models;
    generating multiple confidence threshold values;
    building multiple model groups, each model group including all of the binary classification models for a different one of the confidence threshold values;
    splitting training data into multiple parts and forming different training data sets from the parts;
    cross-training all models within each model group using the different training data sets;
    computing an individual classification error for each model in each model group;
    merging individual classification errors for all models within a particular model group to arrive at a combined classification error for each model group;
    selecting a set of the model groups based on their respective combined classification errors relative to an error threshold;
    calculating a feature importance value for each feature in each model of a given model group in the set;
    computing an importance stability value for each model group in the set based on the feature importance values;
    selecting a final model group from the set having the maximum importance stability value; and
    selecting a plurality of optimized features based on a ranking of feature importance for the final model group.

2. The computer-implemented method of claim 1 wherein the multiple confidence threshold values are generated by incrementing a starting confidence threshold value by a step value.

3. The computer-implemented method of claim 2 wherein the starting confidence threshold value is based on a ratio of positive-to-negative cases in the training data.

4. The computer-implemented method of claim 1 wherein a given training data set excludes at least one part of the training data, and a given individual classification error is computed by testing each model using a respective one of the excluded parts of the training data.

5. The computer-implemented method of claim 1 wherein said computing the importance stability value for the given model group includes:

computing intermediate stability values for different pairs of models in the given model group according to a number of changed feature importance values between models in a given pair; and summing the intermediate stability values of all pairs in the given model group.

6. The computer-implemented method of claim 1 wherein there is more than one final model group having the maximum importance stability value, and further comprising selecting a particular one of the final model groups based on a voting scheme that uses means and variances of the feature importance values for models in each of the final model groups.

7. The computer-implemented method of claim 1 further comprising:

training a binary classifier according to the final model group and the optimized features; and using the binary classifier to compute a most likely category for input scenario data.

8. A computer system comprising:

one or more processors which process program instructions;

a memory device connected to said one or more processors; and program instructions residing in said memory device for optimizing feature importance for binary classification by receiving a plurality of binary classification models, generating multiple confidence threshold values, building multiple model groups, each model group including all of the binary classification models for a different one of the confidence threshold values, splitting training data into multiple parts and forming different training data sets from the parts, cross-training all models within each model group using the different training data sets, computing an individual classification error for each model in each model group, merging individual classification errors for all models within a particular model group to arrive at a combined classification error for each model group, selecting a set of the model groups based on their respective combined classification errors relative to an error threshold, calculating a feature importance value for each feature in each model of a given model group in the set, computing an importance stability value for each model group in the set based on the feature importance values, selecting a final model group from the set having the maximum importance stability value, and selecting a plurality of optimized features based on a ranking of feature importance for the final model group.

9. The computer system of claim 8 wherein the multiple confidence threshold values are generated by incrementing a starting confidence threshold value by a step value.

10. The computer system of claim 8 wherein the starting confidence threshold value is based on a ratio of positive-to-negative cases in the training data.

11. The computer system of claim 8 wherein a given training data set excludes at least one part of the training data, and a given individual classification error is computed by testing each model using a respective one of the excluded parts of the training data.

12. The computer system of claim 8 wherein computing the importance stability value for the given model group includes:

computing intermediate stability values for different pairs of models in the given model group according to a number of changed feature importance values between models in a given pair; and summing the intermediate stability values of all pairs in the given model group.

13. The computer system of claim 8 wherein there is more than one final model group having the maximum importance stability value, and further comprising selecting a particular one of the final model groups based on a voting scheme that uses means and variances of the feature importance values for models in each of the final model groups.

14. The computer system of claim 8 wherein said program instructions further:

train a binary classifier according to the final model group and the optimized features; and use the binary classifier to compute a most likely category for input scenario data.

15. A computer program product comprising:

one or more computer readable storage media; and program instructions collectively residing in said one or more computer readable storage media for optimizing feature importance for binary classification by receiving a plurality of binary classification models, generating multiple confidence threshold values, building multiple model groups, each model group including all of the binary classification models for a different one of the confidence threshold values, splitting training data into multiple parts and forming different training data sets from the parts, cross-training all models within each model group using the different training data sets, computing an individual classification error for each model in each model group, merging individual classification errors for all models within a particular model group to arrive at a combined classification error for each model group, selecting a set of the model groups based on their respective combined classification errors relative to an error threshold, calculating a feature importance value for each feature in each model of a given model group in the set, computing an importance stability value for each model group in the set based on the feature importance values, selecting a final model group from the set having the maximum importance stability value, and selecting a plurality of optimized features based on a ranking of feature importance for the final model group.

16. The computer program product of claim 15 wherein the multiple confidence threshold values are generated by incrementing a starting confidence threshold value by a step value.

17. The computer program product of claim 15 wherein the starting confidence threshold value is based on a ratio of positive-to-negative cases in the training data.

18. The computer program product of claim 15 wherein a given training data set excludes at least one part of the training data, and a given individual classification error is computed by testing each model using a respective one of the excluded parts of the training data.

19. The computer program product of claim 15 wherein computing the importance stability value for the given model group includes:

computing intermediate stability values for different pairs of models in the given model group according to a number of changed feature importance values between models in a given pair; and summing the intermediate stability values of all pairs in the given model group.

20. The computer program product of claim 15 wherein there is more than one final model group having the maximum importance stability value, and further comprising selecting a particular one of the final model groups based on a voting scheme that uses means and variances of the feature importance values for models in each of the final model groups.

* * * * *